United States Patent [19]
Mohan et al.

[11] Patent Number: 6,137,992
[45] Date of Patent: *Oct. 24, 2000

[54] VEHICLE AUDIO DISTORTION MEASUREMENT SYSTEM

[75] Inventors: Philip V. Mohan, Troy; Robert S. Odrakiewicz, Sterling Heights; Grainger G. Goodman, Warren; Dave E. Wright, Rochester; Darryl A. Skop, Southgate; Andrew Xiong, Troy; David L. McMillian, Detroit; James J. Yuzwalk, Oxford, all of Mich.

[73] Assignee: Chrysler Corporation, Auburn Hills, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/886,532

[22] Filed: Jul. 1, 1997

[51] Int. Cl.⁷ .................................................. H04B 1/00
[52] U.S. Cl. ...................................... 455/67.2; 455/226.1
[58] Field of Search ............................ 455/226.1–226.4, 455/423, 67.1–67.3, 63, 296, 299, 278.1, 67.4

[56] References Cited

U.S. PATENT DOCUMENTS

| | | |
|---|---|---|
| 2,913,577 | 11/1959 | Johnson . |
| 3,365,667 | 1/1968 | Deutsch et al. . |
| 3,693,076 | 9/1972 | Nugent et al. . |
| 3,940,715 | 2/1976 | Lum . |
| 4,028,622 | 6/1977 | Evans et al. . |
| 4,034,299 | 7/1977 | Cho et al. . |
| 4,068,176 | 1/1978 | McTaggart . |
| 4,234,964 | 11/1980 | Cielak et al. . |
| 4,245,352 | 1/1981 | Karpowycz . |
| 4,340,854 | 7/1982 | Jones et al. . |
| 5,133,083 | 7/1992 | Crilly, Jr. et al. . |
| 5,263,185 | 11/1993 | Bush . |
| 5,327,091 | 7/1994 | Loughry . |
| 5,361,305 | 11/1994 | Easley et al. . |
| 5,475,315 | 12/1995 | Cabot . |
| 5,511,129 | 4/1996 | Craven et al. . |
| 5,749,047 | 5/1998 | Cabot ..................................... 455/67.4 |
| 5,751,148 | 5/1998 | Kennedy et al. ...................... 455/67.3 |

OTHER PUBLICATIONS

Neal et al. Ambient Measurements in a Semi–Anechoic Chamber. IEEE Internation Symposium on Electromagnetic Compatibility. pp. 123–126, Aug. 1994.
McKeever, K.M. Quantifying Automotive RFI. IEEE Colloquium on EMC and the Motor Vehicle.. pp. 7/1–7/3, 1992.
Crowther, M.T. Radio Interference and Test Method. IEE Colloquium on Vehicle Electromagnetic Compatibility. 2/1–2/3, 1988.
Price, K. Test Medthods for Whole Vehicle Radiated Susceptibility. IEE Colloquium on Vehicle Electromagnetic Compatilibity. pp. 3/1–3/3, 1988.
Ball et al. EMC Testing Rover Cars. Engineering Science and Education Journal. vol. 1, Issue 6. pp. 261–266, Dec. 1992.
Lever et al. Autoprofiling–saving time in RF Immunity testing. IEE Colloquium on Low Cost EMC Testing. pp. 4/1–4/5, 1993.
Kummer et al. Antenna Measurements—1978. Proceedings of the IEEE, vol. 66, No. 4, Apr. 1978.

*Primary Examiner*—Emanuel Todd Voeltz
*Assistant Examiner*—M. David Sofocleous
*Attorney, Agent, or Firm*—Roland A. Fuller, III

[57] ABSTRACT

A radio frequency audio distortion measurement system for a motor vehicle radio. The system includes a generator that generates test RF signals and transmits the signals to the motor vehicle radio through a wireless communication link. The system includes a controller coupled to the generator that controls the transmission of the RF signals to the radio. The system also includes a distortion analyzer coupled to the RF receiver and the controller that senses and analyzes the audio distortion caused by motor vehicle system components, such as motor vehicle electrical and electronic system components, in response to commands output from the controller. The system of the present invention thereby provides an objective way of analyzing audio distortion caused by radiated conducted and/or coupled interference from electrical and electronic systems in a controlled test environment.

26 Claims, 4 Drawing Sheets

VEHICLE AUDIO DISTORTION MEASUREMENT SYSTEM

BACKGROUND OF THE INVENTION

1. Technical Field

The present invention relates generally to radio audio distortion testing, and more particularly to a system for measuring motor vehicle radio audio system distortion caused by spurious conducted, coupled, and RF emissions from vehicle electrical and electronic system components.

2. Discussion

Quantifying the audio quality of vehicles and other motor driven apparatus, with various electrical and electronic systems has long yielded inconsistent results. Conventionally, audio distortion caused by electrical and electronic systems has been measured and tested through actual human perception of the signal distortion. Such testing typically yields varying results, as human perception can often vary from day to day due to numerous physical and psychological factors.

In addition, audio evaluation of noise interference has also yielded inconsistent results due to changing environmental conditions. Variables such as radio station output power, sun-spot cycles, and atmospheric conditions can vary radio signals transmitted and received during audio distortion analysis. As a result, measuring audio noise in a controlled test environment and correlating it to noise as heard by a motor vehicle operator has been a difficult task.

SUMMARY OF THE INVENTION

Accordingly, the present invention provides a radio distortion measurement (RDM) system that measures the response of a motor vehicle radio and/or audio system to motor vehicle noise. An RF generator is used in conjunction with a vehicle transverse electromagnetic (TEM) mode cell to provide a non-contacting coupling between the TEM cell and the vehicle audio system antenna for transmission of an RF signal to the audio system. The system measures the amount of audio system noise that is generated by motor vehicle components that causes degradation in the signal output through the vehicle audio system.

In particular, the present invention provides an audio distortion measurement system for an RF receiver installed in proximity to a source of electrical interference. The system includes a generator that generates RF signals and transmits the RF signals to an RF receiver through a non-contacting link. The system includes a controller coupled to the generator that controls transmission of the RF signals to the receiver. The system also includes a distortion analyzer coupled to the audio amplifier output, and a controller that commands the audio distortion analysis.

The present invention also provides a method of measuring the amount of conducted, coupled, and RF interference caused by motor vehicle system components. "First a motor vehicle is placed in a test cell. An RF reference signal is transmitted to a motor vehicle RF signal receiver via the test cell. The ambient audio distortion of the audio system is measured. Then, certain motor vehicle system components are selectively activated and the subsequent audio signal distortion caused by the activated components is measured."

DETAILED DESCRIPTION OF THE PREFERRED EMBODIMENT

Figure 1:
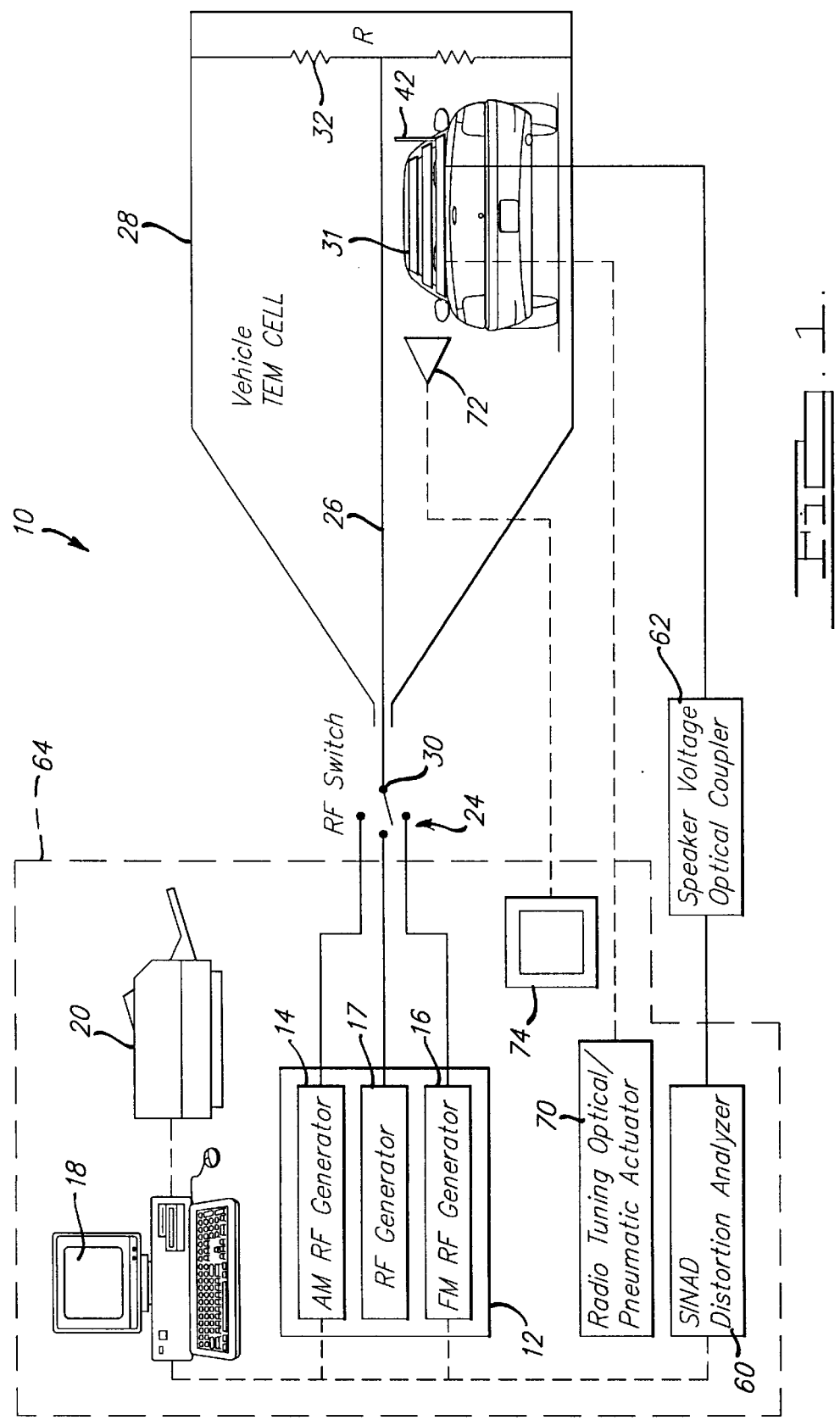
FIG. 1 is a block schematic diagram of a radio distortion measurement system according to a first preferred embodiment of the present invention.

Referring now to the drawing figures, a radio distortion measurement (RDM) system according to a preferred embodiment of the present invention is shown generally at 10. The RDM system of the present invention eliminates the subjectivity associated with conventional human perception analysis of radio distortion in conventional audio distortion testing. In addition, the RDM system of the present invention provides an isolated environment in which radio distortion testing is conducted, thereby minimizing the effects of external conditions, such as atmospheric conditions and varying radio station power output, that influence the results of conventional RF distortion analysis tests. The RDM system analyzes noises that distort a controlled RF signal, and allows comparison of audio signals generated in conjunction with suppressed and unsuppressed electrical and electronic (E/E) systems. The RDM system also provides repeatable measurements so that different E/E system designs may be compared.

The RDM system of the present invention includes an RF generator 12 for generating and transmitting RF signals. The RF generator 12 preferably includes both an AM RF generator 14 such as a leader LSG-245 AM stereo signal generator, and a conventional FM RF generator 16. Alternatively, the RF generator could be configured to include a generator 17 operative to generate RF signals having a frequency of 100 KHz–1.0 GHz (two-way radio frequencies, European bands) and/or 1.2 GHz–1.5 GHz (mobil link, navigation system frequencies), or any other narrow or broad band RF frequency, for signal distortion testing purposes. The RF generator 12 is coupled to the controller, such as a conventional Hewlett Packard® personal computer with an Intel® Pentium® processor, shown generally at 18. The controller 18 is programmed through conventional software programming techniques to control generated and transmitted RF signal parameters, such as signal amplitude and frequency. The controller output device 20, such as a conventional plotter, is associated with the controller 18 for printing output distortion measurement results.

Still referring to FIG. 1, the RF generator 12 includes a generator output 24. A septum 26 associated with a vehicle test cell 28, forms a wireless communication link between the generator and the vehicle audio system. As both AM and FM RF generators are implemented in the generator 12, a switching mechanism, such as an RF switch 30, allows selective switching between the RF generators 14, 16, 17 as required. The vehicle test cell 28 is preferably a transverse electromagnetic (TEM) test cell having dimensions large enough to accommodate a conventional motor vehicle, such as the motor vehicle shown at 31 therein, and includes a resistive termination 32 that is operative to insure proper impedance matching for the RF signal.

Figure 2:
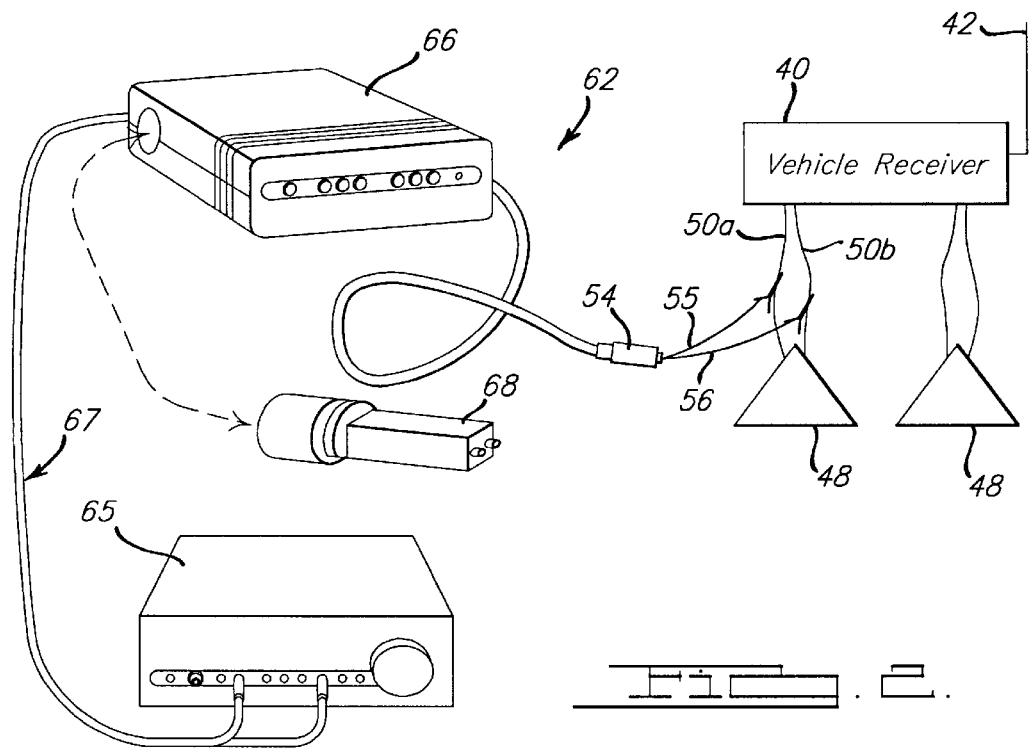
FIG. 2 illustrates certain components of FIG. 1 in more detail.

Referring in detail to FIGS. 1 and 2, the motor vehicle 31 houses a radio receiver 40 to be tested. The receiver 40 receives the RF signal broadcast from the TEM septum 26 via receiver antenna 42. A wireless link between the antenna 42 and the septum 26 allows the RF signal to be coupled to the vehicle audio system without a mechanical connection to the vehicle antenna. The wireless link provides a significant advantage over conventional mechanically coupled RF testing systems, in that it minimizes the chance that the vehicle body is grounded to the test cell. The wireless link thus prevents shorting out of a significant amount of RF noise, as the vehicle body remains isolated from the chamber.

Referring to FIGS. 1 and 2, audio speakers 48 are coupled to the radio receiver 40 for outputting the received audio signal. The speakers are coupled to the receiver through speaker leads, including speaker ground wire 50a and voltage input wire 50b, or, alternatively through a power amplifier (not shown) typically included in the vehicle audio system for driving the speakers 43.

Referring to FIGS. 1 and 2, the RDM system also includes a distortion analyzer 60 operatively connected to the controller 18. The distortion analyzer 60 is preferably a signal noise and distortion (SINAD) analyzer, such as RE Technology Analyzer, Model No. 204. The distortion analyzer is coupled to the radio receiver 40 via a speaker voltage optical isolator 62 that is tapped into the speaker leads 50 or, alternatively, to the power amp to measure the signal output by the receiver 40 to the speakers 48 as described below. The distortion analyzer 60 thereby is capable of detecting and analyzing capacitively or inductively coupled noise, caused by cross talk between wires in the motor vehicle E/E system. The distortion analyzer is also capable of detecting and analyzing radiated noise received by the antenna 42, as well as conductive noise picked up by the receiver from the motor vehicle alternator and other vehicle noise sources(not shown).

It should be appreciated that the speaker voltage optical isolator is preferably an optical isolator such as that manufactured by Nicolet, Model No. Isobe 3000 and used to transmit analog voltage from voltage probes, such as the probe 54, in the test chamber to the receiver unit 65 in the operator control room 64. The probe is preferably of the type that includes a connector 55 for connecting the probe to the speaker ground wire 50a, and a connector 56 for connecting the probe to the speaker voltage input wire 50b. The optical isolator also includes a receiver unit 65 located in the control room, a transmitter unit 66 located in the TEM cell, fiberoptic cable 67 interconnecting the coupler components, and a battery pack 68 that is insertable into the transmitter to provide power thereto. The optical isolator allows voltages to be measured without affecting the circuit being measured and is used for real time measurement of the audio signal at the vehicle speaker.

Still referring to FIGS. 1 and 2, the RDM system of the present invention includes a radio tuning actuator, shown at 70 in FIG. 1, that is in operative communication with the receiver 40 to selectively tune the frequency of the receiver. Preferably, the actuator 70 is a pneumatic actuator that provides optically isolated tuning of the receiver to the RF frequency generated by the RF frequency generator 12. Alternatively, the radio tuning actuator may be a pneumatic actuator with small pneumatic cylinders for providing pneumatic actuation of receiver tuning controls to tune the receiver 40 to the frequency generated by the RF generator 12. Additionally, a battery operated camera 72 with a fiber optic transmitter installed in proximity to the motor vehicle such that an RDM system operator located in the control room may visually check the frequency at which the receiver 40 is tuned via a conventional cathode ray tube display 74.

Figure 3:
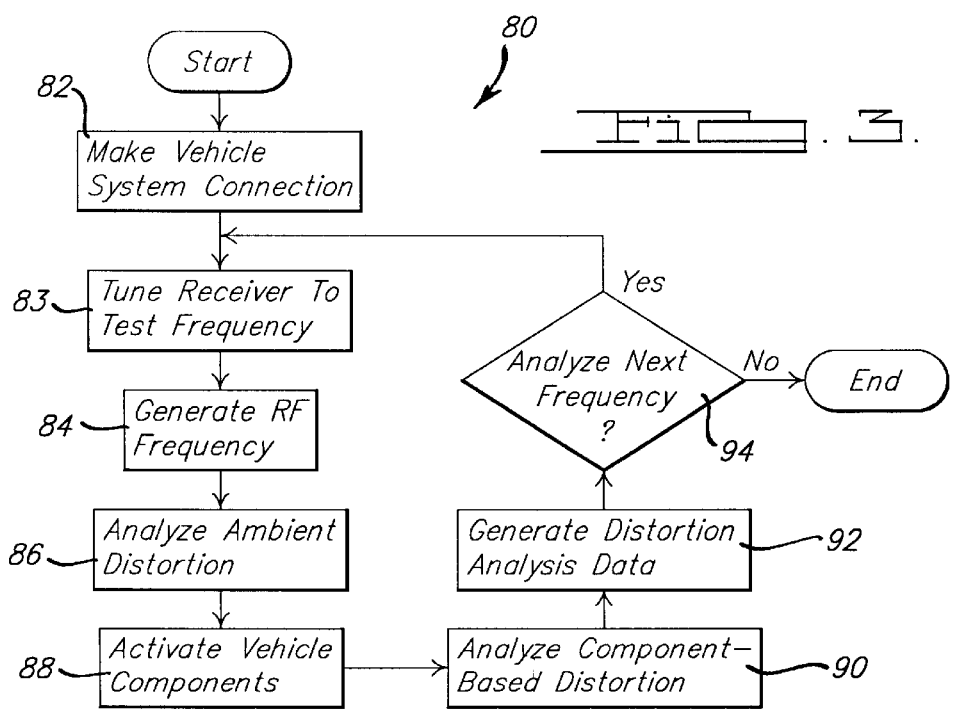
FIG. 3 is a flow diagram illustrating the methodology associated with the system of FIG. 1.

Referring now to FIG. 3, the methodology associated with operation of the RDM system of the present invention will now be described in conjunction with the flow diagram shown generally at 80 in FIG. 3. Subsequent to all vehicle/RDM system connections being made at 82, an RF frequency is selected at 83 via the actuator 70. Subsequently, the RF frequency is generated by the generator 12 at 84. At 86, ambient distortion is analyzed by the distortion analyzer 60. At 88, the selected component or components in the motor vehicle E/E system is/are actuated. At 90, component based distortion is analyzed by the distortion analyzer 60. At 92, a distortion analysis report is generated and is either stored by the controller and/or output as a hard copy via the plotter output device 20. At 94, the methodology determines if another RF frequency is to be analyzed. If not, the methodology ends. If another frequency is to be analyzed, the methodology returns to 83, and the process is repeated for the new frequency.

Figure 4:
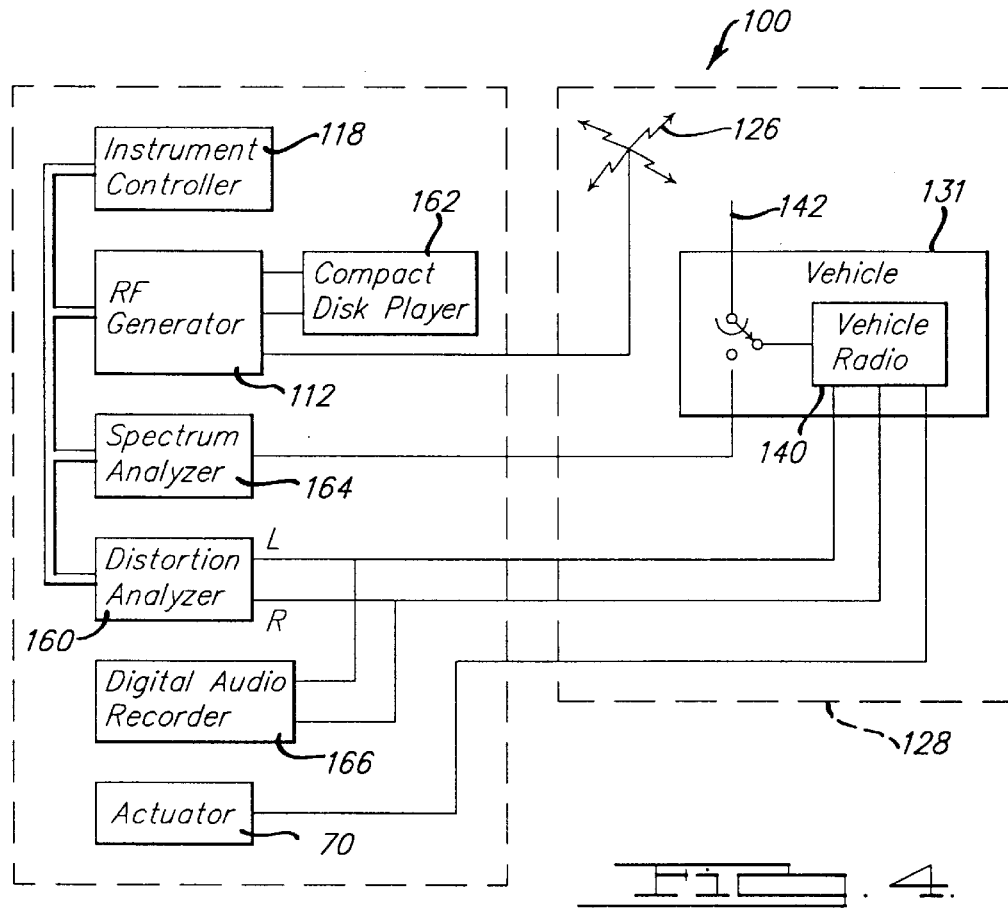
FIG. 4 is a block schematic diagram of a radio distortion measurement system according to a second preferred embodiment of the present invention.

Turning now to FIG. 4, a second preferred embodiment of the present invention is shown generally at 100. As with the system 10, the system 100 includes an RF generator 112, an instrument controller 118 and a distortion analyzer 160. The system also includes a compact disc player 162 such as a TASCAM Model No. CD-301 compact disc player, coupled to the RF generator 112 to generate digital audio signals for transmission through the RF generator 112. The system also includes a spectrum analyzer 164 that monitors the strength of the RF signal being transmitted to the vehicle receiver. Preferably, the spectrum analyzer is one such as that manufactured by Hewlett Packard, Model No. 8568B.

Further, the system includes a digital audio recorder 166, such as a Panasonic digital audio recorder, Model No. SV-3700, coupled to the distortion analyzer that digitally records distortion signals sensed by the distortion analyzer 160 for subsequent analysis purposes.

In addition, the system shown at 100 includes a transmit antenna 126 coupled to the RF generator 112 that transmits the generated RF signals to the vehicle radio 140 through vehicle antenna 142. The vehicle 131 is isolated within a whole vehicle shield room 128, as opposed to the TEM cell 28 shown in FIG. 1. The transmit antenna 126 transmits the signals as opposed to the TEM septum 26 in FIG. 1. Alternatively, the vehicle shield room could be an anechoic chamber or reverberation chamber.

The system 100 operates in a manner similar to the system 10. However, because the whole vehicle shield room 128 is not a TEM cell, the strength of the signal being transmitted to the vehicle antenna is monitored through the spectrum analyzer 164 to ensure that the transmitted signal has the correct signal strength for distortion measurement purposes.

Figure 5:
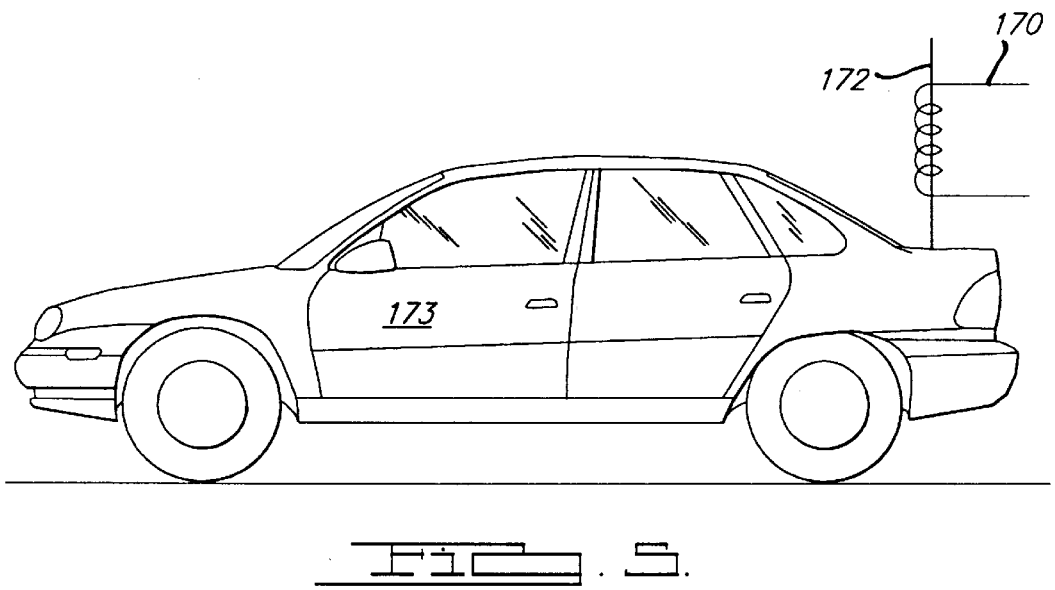
FIGS. 5–8 illustrate alternate wireless links that transmit an RF signal to a motor vehicle receiver.
Figure 6:
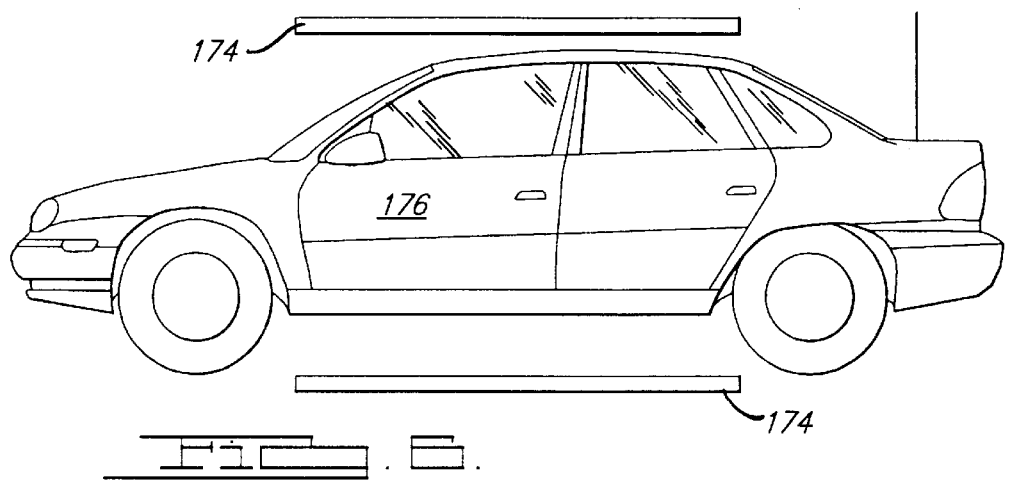
Figure 7:
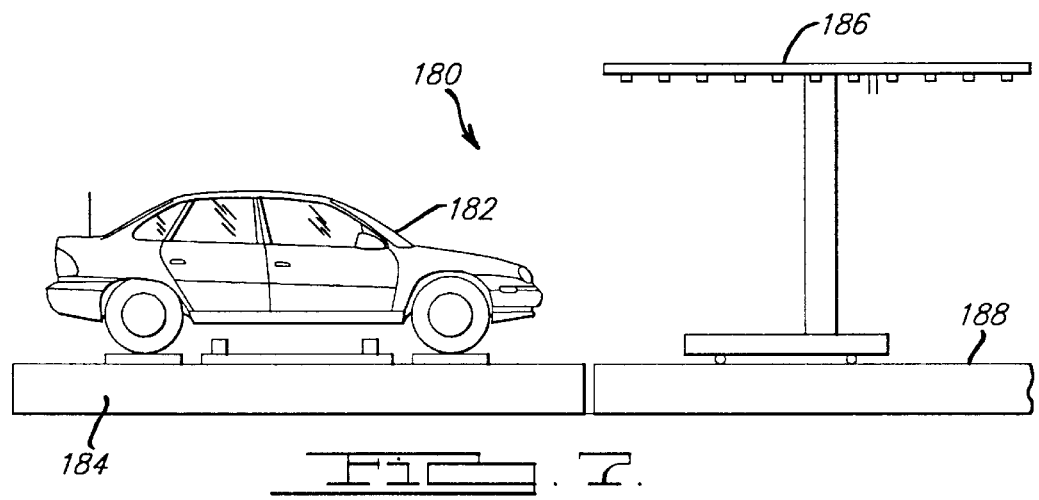
Figure 8:
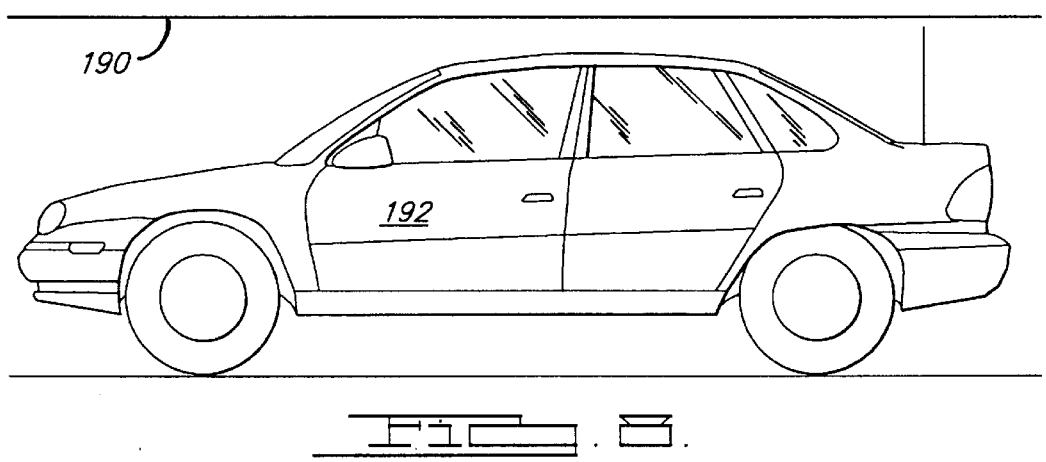

FIGS. 5–8 illustrate alternative RF coupling links between the RF generator and the motor vehicle receiver that could be utilized in place of the TEM system 26 or the transmit antenna 126. In FIG. 5, several turns of wire 170 connected to an RF generator (FIGS. 1, 4) are wrapped around a vehicle antenna 172 of a motor vehicle 173 for RF coupling purposes. In FIG. 6, a parallel plate antenna 174 associated with an RF generator (FIGS. 1, 4) is positioned in proximity to a motor vehicle 176 for RF coupling. Alternatively, FIG. 7 illustrates an off-vehicle antenna RF coupling system 180 in which a motor vehicle 182 is placed on a turntable 184. An antenna 186 is located in proximity to the turntable above the test chamber floor 188 and transmits an RF signal generated by the RF generator (see FIGS. 1, 4) as the vehicle is rotated. In addition, FIG. 8 illustrates generally an RF generator link 190 that links the motor vehicle 192 with the test system. The link 190 could either be a strip line, an RF transmission line, or a lightly shielded coaxial line.

As can be determined from the foregoing description, the RDM system of the present invention provides an objective method of testing for distortion caused by motor vehicle ignition system and electrical and electronic system components, thereby eliminating error associated with subjective human listening tests. The RDM system of the present invention provides an isolated testing environment that eliminates variations in parameters such as radio station transmitter output power, sun-spot cycles, and atmospheric conditions that often vary radio signals transmitted to the motor vehicle receiver during distortion listening evaluations. The RDM system of the present invention thereby provides a system that accurately analyzes radio sound including ambient and motor vehicle component based signal distortion as heard by a motor vehicle operator, in an environment that allows for objective testing of the distortion and accurate reproduction of test results.

While the above detailed description describes the preferred embodiment of the present invention, the invention is susceptible to modification, variation and alteration without deviating from the scope and fair meaning of the subjoined claims.

What is claimed is:

1. An audio frequency distortion measurement system for measuring the response of a motor vehicle audio system to noise caused by a motor vehicle components, comprising:
    a generator that generates RF signals and transmits said RF signals to a motor vehicle RF receiver through a communication link;
        said RF receiver including an electrical output for driving a speaker;
    a controller coupled to said generator that controls transmission of said RF signals to said receiver and selectively activates the motor vehicle component; and
    a distortion analyzer coupled to said RF receiver electrical output and said controller that senses and analyzes audio distortion in response to signal analysis commands that are output from said controller;
    wherein said distortion analyzer is commanded to analyze the audio output distortion caused by said motor vehicle component.

2. The system of claim 1, wherein said communication link comprises a vehicle test cell configured to transmit the RF signals generated by said generator; and
    an antenna coupled to the receiver that receives said RF signals transmitted by said vehicle test cell.

3. The system of claim 2, further comprising an RF switch between said generator and said test cell that selectively couples said generator and said test cell.

4. The system of claim 2, wherein said vehicle test cell comprises a transverse electromagnetic (TEM) cell.

5. The system of claim 1, further comprising a test cell that provides an isolated environment for testing said receiver.

6. The system of claim 5, further comprising an antenna coupled to said generator and located in said test cell that transmits said RF signals to said RF receiver.

7. The system of claim 1, wherein the receiver comprises a motor vehicle or other motor driven apparatus audio system.

8. The system of claim 1, wherein said generator generates AM radio signals.

9. The system of claim 1, wherein said generator generates FM radio signals.

10. The system of claim 1, wherein said generator generates RF signals in the range of between 100 KHz and 1 GHz.

11. The system of claim 1, wherein said generator generates RF signals in the range of between 1.2 GHz and 1.5 GHz.

12. The system of claim 1, further comprising an actuator that selects particular RF frequencies to be tested.

13. The system of claim 1, wherein said distortion analyzer comprises a signal noise and distortion (SINAD) analyzer that measures audio signal distortion.

14. The system of claim 1, wherein said generator is coupled to the receiver via a wireless data link.

15. The system of claim 1, further comprising an audio recorder that records audio system interference correlatable to results generated by said distortion analyzer for subsequent distortion analysis purposes.

16. The system of claim 1, wherein said communication link is selected from a group consisting of: a shielded test chamber, an anechoic chamber, a reverberation chamber, wire wrapped around a vehicle antenna, a parallel plate antenna, an off-vehicle antenna, strip line and lightly shielded coaxial cable.

17. A method of testing radio frequency (RF) signal distortion created by motor vehicle system components, comprising:
    placing a motor vehicle in a test cell;
    activating a motor vehicle RF signal receiver;
    transmitting an RF signal to the motor vehicle RF signal receiver via the test cell;
    selectively activating certain motor vehicle system components; and
    measuring audio signal distortion caused by the selectively activated motor vehicle system components.

18. The method of claim 17, wherein said step of placing a motor vehicle in a test cell comprises placing the motor vehicle in the transverse electromagnetic (TEM) mode cell.

19. The method of claim 18, wherein said step of transmitting an RF signal to a motor vehicle comprises transmitting an RF signal to a motor vehicle through a TEM cell septum.

20. The method of claim 17, wherein said step of measuring audio signal distortion caused by the activated motor vehicle system components comprises:
    measuring ambient audio signal distortion prior to said step of selectively activating certain motor vehicle system components;
    measuring audio signal distortion subsequent to said step of selectively activating certain motor vehicle system components; and
    subtracting said ambient audio signal distortion from said audio signal distortion measured subsequent to said step of selectively activating said motor vehicle system components to determine audio signal distortion caused by the activated motor vehicle system components.

21. The method of claim 17, wherein said step of transmitting an RF signal comprises transmitting an AM RF signal.

22. The method of claim 17, where said step of transmitting an RF signal comprises transmitting an FM RF signal.

23. The method of claim 17, further comprising the step of selectively adjusting the strength of said RF signal to analyze incremental signal distortion.

24. The method of claim 17, further comprising the step of incrementally adjusting the frequency of said RF signal to analyze said RF signal distortion across a predetermined frequency range.

25. The method of claim 17, further comprising the step of recording results obtained from said step of measuring RF signal distortion.

26. A system that analyzes audio distortion output by a motor vehicle radio as a result of motor vehicle component interference, comprising:

an FM RF signal generator that generates test FM RF signals;

an AM RF signal generator that generates test AM RF signals;

a switching device coupled to the FM RF signal generator and the AM RF signal generator such that selective switching between the RF signals is provided;

a transverse electromagnetic (TEM) test cell that provides an isolated motor vehicle test environment, said TEM cell including a septum coupled to said switching device for transmitting said selected RF signals to a motor vehicle radio inside said TEM test cell;

a radio tuning actuator in operative communication with the motor vehicle radio to selectively tune the frequency of the receiver;

a distortion analyzer operatively coupled to the motor vehicle radio through a communications bus that evaluates audio signals output from the radio for motor vehicle induced distortion and generates signal distortion data relating thereto;

said communications bus including an optical isolator to permit the measurement of signals without affecting the circuit being measured; and a controller operatively coupled to said RF signal generator and said distortion analyzer for controlling system operations.

\* \* \* \* \*